(12) United States Patent
Card et al.

(10) Patent No.: US 6,970,857 B2
(45) Date of Patent: Nov. 29, 2005

(54) INTELLIGENT CONTROL FOR PROCESS OPTIMIZATION AND PARTS MAINTENANCE

(75) Inventors: Jill P. Card, West Newbury, MA (US); Wai T. Chan, Newburyport, MA (US); An Cao, Arlington, MA (US)

(73) Assignee: Ibex Process Technology, Inc., Lowell, MA (US)

( * ) Notice: Subject to any disclaimer, the term of this patent is extended or adjusted under 35 U.S.C. 154(b) by 175 days.

(21) Appl. No.: 10/656,607

(22) Filed: Sep. 5, 2003

(65) Prior Publication Data

US 2004/0049297 A1 Mar. 11, 2004

Related U.S. Application Data

(60) Provisional application No. 60/408,500, filed on Sep. 5, 2002.

(51) Int. Cl.[7] .............................. G06E 1/00; G06E 3/00; G06F 15/18; G06G 7/00
(52) U.S. Cl. ............................ 706/19; 706/21; 706/44; 700/29; 700/36; 700/48; 700/54; 700/173; 702/182; 702/184; 703/2
(58) Field of Search ............................... 700/28–31, 36, 700/37, 44, 45, 48, 54, 55, 71, 173; 703/2; 706/15–17, 19, 21, 44; 702/181–185

(56) References Cited

U.S. PATENT DOCUMENTS

| | | | | |
|---|---|---|---|---|
| 4,628,462 A | * | 12/1986 | Putman | 700/288 |
| 5,195,041 A | * | 3/1993 | George et al. | 700/100 |
| 5,347,446 A | * | 9/1994 | Iino et al. | 700/29 |
| 5,467,883 A | | 11/1995 | Frye et al. | 216/60 |
| 5,559,690 A | | 9/1996 | Keeler et al. | 364/164 |
| 5,617,342 A | * | 4/1997 | Elazouni | 703/6 |
| 5,654,903 A | | 8/1997 | Reitman et al. | 364/551.01 |
| 5,740,033 A | | 4/1998 | Wassick et al. | 364/149 |
| 6,246,972 B1 | * | 6/2001 | Klimasauskas | 703/2 |
| 6,268,226 B1 | | 7/2001 | Angell et al. | 438/16 |
| 6,594,575 B2 | * | 7/2003 | Pflugl et al. | 701/102 |
| 6,721,609 B1 | * | 4/2004 | Wojsznis et al. | 700/28 |
| 6,775,647 B1 | * | 8/2004 | Evans et al. | 703/7 |
| 6,839,599 B2 | * | 1/2005 | Martin et al. | 700/79 |
| 2002/0077711 A1 | * | 6/2002 | Nixon et al. | |
| 2003/0145836 A1 | * | 8/2003 | Linna et al. | |
| 2003/0171897 A1 | * | 9/2003 | Bieda et al. | |
| 2003/0191728 A1 | * | 10/2003 | Kulkarni et al. | |
| 2004/0015461 A1 | * | 1/2004 | Lo | |
| 2004/0017575 A1 | * | 1/2004 | Balasubramanian et al. | |
| 2005/0007249 A1 | * | 1/2005 | Eryurek et al. | |

FOREIGN PATENT DOCUMENTS

| | | | |
|---|---|---|---|
| DE | 196 37 917 A1 | 3/1998 | G05B/13/04 |
| WO | WO 01/57605 | 8/2001 | G05B/13/04 |

OTHER PUBLICATIONS

D. Senthil Kumaran et al., "Environmental life cycle cost analysis of products", Environmental Managment and Health, 2001, vol. 12 No. 3, ABI/INFORM Global pp. 260–276.*

Card et al., "Dynamic Neural Control for Plasma Etch Process," IEEE Transactions on Neural Networks, (1997).

Card et al., "Impacts of Maintenance Input on the Prediction Accuracy of an APC Controller," Presentation at AEC/APC Symposium XIV (Sep. 9–11, 2002).

(Continued)

Primary Examiner—Anthony Knight
Assistant Examiner—Crystal J. Barnes
(74) Attorney, Agent, or Firm—Goodwin Procter LLP

(57) ABSTRACT

Complex process control and maintenance are performed utilizing a nonlinear regression analysis to determine optimal maintenance activities and process adjustments based on an urgency metric.

18 Claims, 4 Drawing Sheets

OTHER PUBLICATIONS

Card et al. "Advanced Analysis of Dynamic Neural Control Advisories for Process Optimization and Parts Maintenance," Presentation at AEC/APC Symposium XIV (Sep. 9–11, 2002).

Dillon et al., "Guest Editorial Everyday Applications of Neural Networks," *IEEE Transactions on Neural Networks*, 8:4 (Jul. 1997).

Hatzipantelis et al., "Comparing Hidden Markov Models with Artificial Neural Network Architectures for Condition Monitoring Applications," *Artificial Neural Networks*, 26–28, Conference Publication No. 409 (Jun. 1995).

Kim et al., "Intelligent Control of Via Formation by Photosensitive BCB for MCM–L/D Applications," *IEEE Transactions on Semiconductor Manufacturing*, 12:503 (1999).

Konstantopoulos et al., "Controllers with Diagnostic Capabilities. A Neural Network Implementation. Journal of Intelligent and Robotic Systems," Department of Electrical Engineering, University of Notre Dame, IN 12: 197–228 (1995).

Moyne, "AEC/APC Vision: A Research and Suppliers' Point of View," 3$^{rd}$ Annual European AEC/APC Conference Proceedings (2002).

Rietman et al., "A Study on $R^m \rightarrow R^1$ Maps: Application to a 0.16-$\mu$m Via Etch Process Endpoint," *IEEE* (2000).

Rietman et al., "A System Model for Feedback Control and Analysis of Yield: A Multistep Process Model of Effective Gate Length, Poly Line Width, and IV Parameters", *IEEE*(2001).

Rietman, "Neural Networks in Plama Processing," *Journal of Vacuum Science and Technology; Part B, IEEE Transactions on Semiconductor Manufacturing*, 14:1 (2001).

Smyth et. al., "Hidden Markov Models and Neural Networks for Fault detection in Dynamic Systems," California Institute of Technology (1993).

Zhang et al, "Control of Spatial Uniformity in Microelectronics Manufacturing: An Integrated Approach," Proceedings of AEC/APC (2000).

\* cited by examiner

INTELLIGENT CONTROL FOR PROCESS OPTIMIZATION AND PARTS MAINTENANCE

CROSS REFERENCE TO RELATED APPLICATIONS

The present application claims the benefit of and priority to U.S. provisional application Ser. No. 60/408,500, filed Sep. 5, 2002, the entire disclosure of which is herein incorporated by reference.

FIELD OF THE INVENTION

The invention relates to the field of process control. In particular, the invention relates prediction and/or control of complex multi-step processes.

BACKGROUND

Process prediction and control is crucial to optimizing the outcome of complex multi-step production processes. For example, the production process for integrated circuits comprises hundreds of process steps (i.e., sub-processes). Each process step, in turn, may have several controllable parameters, or inputs, that affect the outcome of the process step, subsequent process steps, and/or the process as a whole. In addition, the impact of the controllable parameters and maintenance actions on the process outcome may vary from process run to process run, day to day, or hour to hour. The typical integrated circuit fabrication process thus has a thousand or more controllable inputs, any number of which may be cross-correlated and have a time varying, nonlinear relationship with the process outcome. As a result, process prediction and control is crucial to optimizing process parameters and to obtaining, or maintaining, acceptable outcomes.

Regression techniques have been used to model relationships between various process variables and characteristics of the process output (e.g., the quality, according to at least one metric of interest, of a finished product). The use of neural networks has facilitated successful modeling of processes having large numbers of variables whose interrelationship and contribution to the output metric of interest cannot easily be described.

Run-to-run controllers typically base analysis of the controlled process on metric values from a single output piece or a single lot of pieces, such as semiconductor wafers. A risk or cost function may be used to evaluate a set of metric values, permitting the process controller to reduce the risk associated with each wafer. The level of risk may be determined on a variable-by-variable basis and quantified, e.g., on a scale of 0 to 10.

Complex processes such as semiconductor manufacture, however, depend heavily on process and maintenance history. Such environments involve multivariable processes and production equipment vulnerable to gradual degradation but amenable to numerous different preventive maintenance procedures. As the system ages, it can be difficult to determine where to focus maintenance attention and resources. For example, it is often difficult to deduce from small, wafer-to-wafer changes that a particular maintenance action is urgently needed. To obtain a multivariate metric of the urgency of various corrective actions, it is desirable to place analysis of system variables in a time domain, rather than, for example, isolating an individual wafer from the process history.

For a process or system variable, the risk is higher the further the measured value diverges from a target metric for the variable. For some variables that represent the age of a part or the time since a particular maintenance activity was performed on a controlled tool, a decreasing risk may be assigned for a part or maintenance action as the time since the last maintenance activity was performed due to amortization of the initial cost of the part and/or labor to perform the action.

SUMMARY OF THE INVENTION

The present invention provides a method and system for complex process control and optimization by determining a metric to represent the urgency of various corrective actions. In accordance with the invention, a nonlinear regression analysis capable of handling the potentially large number of coefficients is used to determine the relationship between input values and process performance metrics.

In one aspect, the invention comprises a method of controlling the optimization of a complex process having associated operational variables and process outputs by defining a series of corrective actions associated with the process; modeling a relationship between the operational variables and the process outputs measured over time; computing a risk reduction associated with each corrective action; and determining an urgency level, based at least in part on the risk reductions for each of the corrective actions. In one embodiment, the corrective actions comprise maintenance operations. In some embodiments, the corrective actions comprise part replacements. In other embodiments, the corrective actions comprise recipe adjustments. In one embodiment, the modeling step comprises building a nonlinear regression model of the relationship between the operational variables and the process outputs. In an exemplary embodiment, the nonlinear regression model is a neural network. In one embodiment, the urgency level is determined based on a cumulative sum of one or more risk reductions.

In another aspect, the invention comprises an article of manufacture having a computer-readable medium with the computer-readable instructions embodied thereon for performing the methods described in the preceding paragraphs. In particular, the functionality of a method of the present invention may be embedded on a computer-readable medium, such as, but not limited to, a floppy disk, a hard disk, an optical disk, a magnetic tape, a PROM, an EPROM, CD-ROM, or DVD-ROM. The functionality of the method may be embedded on the computer-readable medium in any number of computer-readable instructions, or languages such as, for example, FORTRAN, PASCAL, C, C++, Tcl, BASIC and assembly language. Further, the computer-readable instructions can, for example, be written in a script, macro, or functionally embedded in commercially available software (such as, e.g., EXCEL or VISUAL BASIC).

In other aspects, the present invention provides a system for controlling the optimization of a complex process having associated process outputs. In one embodiment, the system comprises a process monitor and a data processing device. The process monitor monitors process outputs over time. The data processing device receives the process outputs and determines the urgency levels for one or more maintenance actions based on a risk reduction associated with the process outputs and a relationship between the operational variables and the process outputs.

In some embodiments, the system comprises an optimizer for determining one or more maintenance actions based at least in part on the risk reduction. In some embodiments, the optimizer is a feature of the data processing device. In some embodiments, the system further comprises a process controller, responsive to the optimizer, for initiating one or more corrective actions. The system may further comprise a data storage device for providing target corrective action variable values. In some embodiments, the corrective actions initiated by the process controller may comprise maintenance operations. In other embodiments, the corrective actions may comprise part replacements. In still other embodiments, the corrective actions may comprise recipe adjustments.

The foregoing and other objects, aspects, features, and advantages of the invention will become more apparent from the following description and from the claims.

BRIEF DESCRIPTION OF THE DRAWINGS

A fuller understanding of the advantages, nature and objects of the invention may be had by reference to the following illustrative description, when taken in conjunction with the accompanying drawings. The drawings are not necessarily drawn to scale, and like reference numerals refer to the same items throughout the different views.

DETAILED DESCRIPTION

Figure 1:
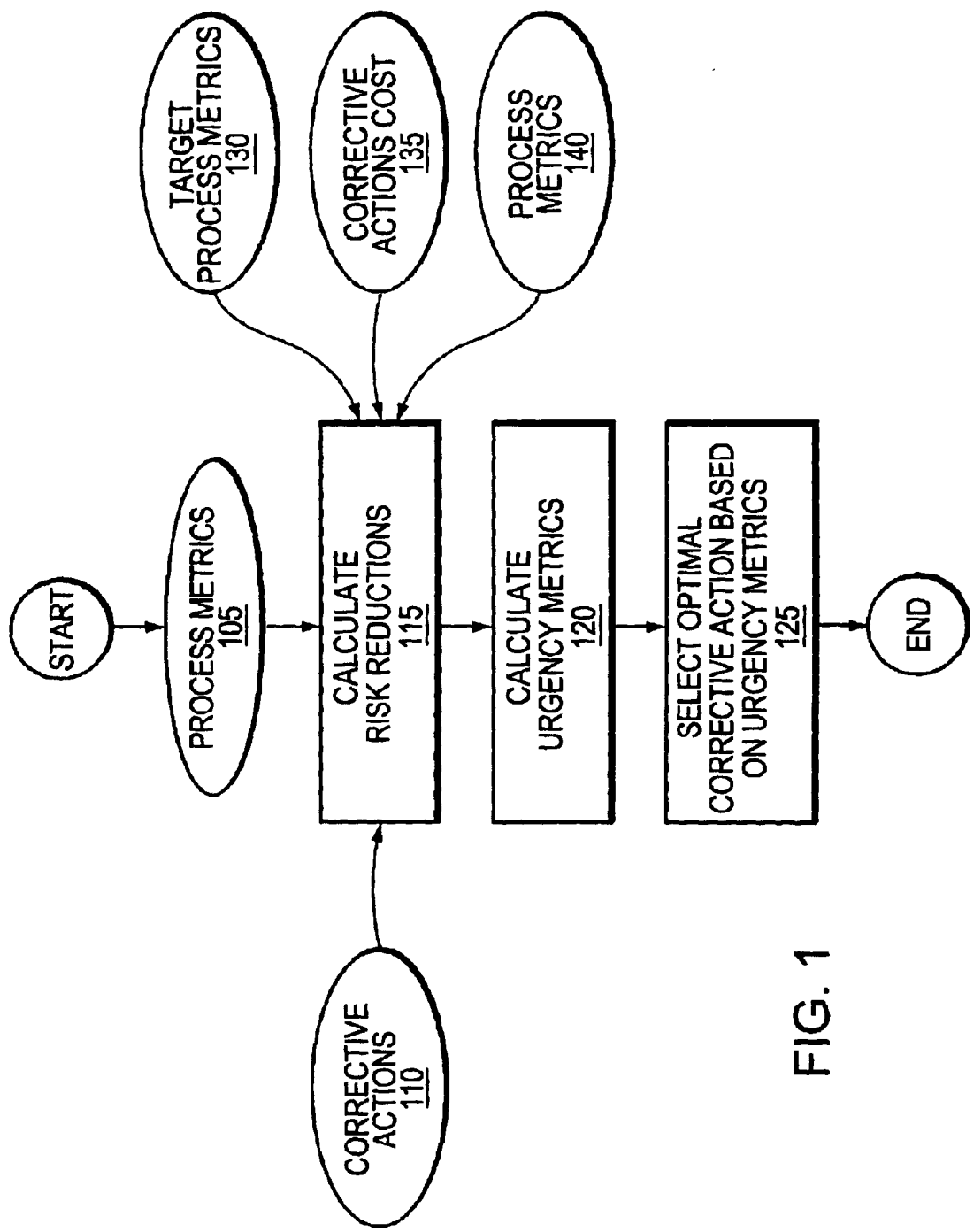
FIG. 1 is a flow diagram illustrating various embodiments of optimization of process maintenance according to the present invention.

The invention provides a method and system for optimizing process maintenance activities using predicted process metrics and operational variables. As used herein, the term "metric" refers to any parameter used to measure the outcome or quality of a process or sub-process (e.g., the yield, a quantitative indication of output quality, etc.) and may include parameters determined both in situ during the running of a sub-process or process, and ex situ, at the end of a sub-process or process, as described above. Metrics include parameters determined both in situ, i.e. during the running of a sub-process or process, and ex situ, at the end of a sub-process or process. The present discussion will focus on wafer production, but it should be understood that the invention is applicable to any complex process, with references to wafers being for purposes of explanation only.

As used herein, the term "operational variables" includes process controls that can be manipulated to vary the process procedure, such as set point adjustments (referred to herein as "manipulated variables"), variables that indicate the wear, repair, or replacement status of a process component(s) (referred to herein as "replacement variables"), and variables that indicate the calibration status of the process controls (referred to herein as "calibration variables"). As used herein, the term "maintenance variables" is used to refer collectively to both replacement variables and calibration variables. Furthermore, it should be understood that acceptable values of process operational variables include, but are not limited to, continuous values, discrete values and binary values.

The operational variable and metric values may be measured values, normalized values, and/or statistical data derived from measured or calculated values (such as a standard deviation of the value over a period of time). For example, a value may be derived from a time segment of past information or a sliding window of state information regarding the process variable or metric.

A variable is considered an input if its value can be adjusted independently from other variables. A variable is considered an output if its value is affected by other input variables. The input-output relationship among the variables may be modeled using a nonlinear regression model, e.g., a neural network based on historical data; see, e.g., U.S. patent application Ser. No. 10/243,963, filed Sep. 13, 2002, the entire disclosure of which is herein incorporated by reference. An optimizer as described in that application may utilize the trained neural network to find a solution with minimum risk by varying the input values.

For example, where the process comprises plasma etching of silicon wafers, manipulated variables ("MV") may include, e.g., the radio frequency (RF) power and process gas flow of one or more plasma reactors. Replacement variables ("RV") may include, e.g., the time since last plasma reactor electrode replacement and/or a binary variable that indicates the need to replace/not replace the electrodes. Calibration variables ("CalV") may include, e.g., time since last machine calibration and/or the need for calibration.

FIG. 1 illustrates an overview of various embodiments of a method of process optimization according to the present invention. The method begins by determining a set of process state metrics 105. A set of corrective actions 110 is defined to represent potential changes to the process. For example, possible corrective actions 110 may be one or more of part replacements, wet cleans, recipe adjustments, and gas pressure modifications, among others. For each corrective action 110, a risk reduction is calculated (Step 115) by determining the difference between the risk for a given wafer with and without the corrective action being taken. In some embodiments, additional data may be included in the calculation of the risk reductions, including process metric costs 140, target process metrics 130, and corrective action costs 135.

The risk for a given wafer, as opposed to a process variable, is defined as:

$$R=\Sigma \text{ Input Risk}+\text{Weight}\times\Sigma \text{ Output Risk, where Weight}\gg 1 \quad \text{Eq. (1)}.$$

In some embodiments, the output variables provide more information about the process quality and the health of the controlled tool, and therefore the output risk may be weighted more heavily. In some embodiments, the number of inputs may be 10 to 20 times higher than the number of outputs, and therefore to compensate, additional weight may be given to the output risk values.

Based on the risk reductions, urgency metrics are calculated (Step 120) for each corrective action, both individually and in concert with each other. Therefore, the deviations from some standard risk value can be accumulated, and the urgency metric may be utilized to capture the maintenance actions and recipe adjustments needed to optimize process health over time, rather than on a wafer-by-wafer basis. The urgency metric is typically based on the concept of cumulative sum (CUSUM) of quality control. However, it should be understood that other smoothing techniques (e.g., exponentially weighted moving average) might also be applied to define the urgency metric.

In quality control, the CUSUM of a statistic x from some standard value $\mu$ for sample r is defined as:

$$S_r = (x_r - \mu) + S_{r-1} = \sum_{i=1}^{r}(x_i - \mu). \qquad \text{Eq. (2)}$$

A "high side" CUSUM may then be calculated as:

$$D_r = \text{Max}[0,(x_r-\mu)+D_{r-1}] \qquad \text{Eq. (3),}$$

where $S_0$ and $D_0$ are both 0.

To determine the urgency of a maintenance action or recipe adjustment, the CUSUM of the risk reduction is calculated. For example, to measure the importance of a wet clean for wafer r, the risk reduction $R_r$ associated with wafer r is first computed using the trained neural network to simulate the effect of a wet clean on the process tool. The "high side" CUSUM of the risk reduction (i.e. the urgency metric) is then computed as:

$$D_r = \text{Max}[0,(R_r-\mu)/\sigma+k+D_{r-1}] \qquad \text{Eq. (4),}$$

where $\mu$ and $\sigma$ are the mean and standard deviation of R, and the value of k is customarily taken as 0.5 to signify the increase in risk reduction on which attention is focused. When $D_r > h$ for some threshold h, a message is broadcast that a wet clean is urgently needed for the tool.

In some embodiments, the risk reduction is computed for each of the specified corrective actions (Step 115) without attempting to optimize the risk reductions associated with combinations of corrective actions. For example, the risk reduction may be calculated by changing one specific maintenance or process input variable for a series of silicon wafers over time, computing the resulting risk reduction for each wafer, and subsequently calculating the urgency metric.

In some embodiments, an optimizer may be used to compute a multiple corrective action solution during the risk reduction calculation process (Step 115). The optimizer finds the best combination of corrective actions (step 125) that includes a specified corrective action and that produces one or more process metrics that are as close as possible to one or more target process metrics 130 at the lowest overall cost. For each corrective action, risk reductions are calculated and the urgency metric is then computed from the sequential wafer risks associated with the multiple corrective action solution.

Figure 2:
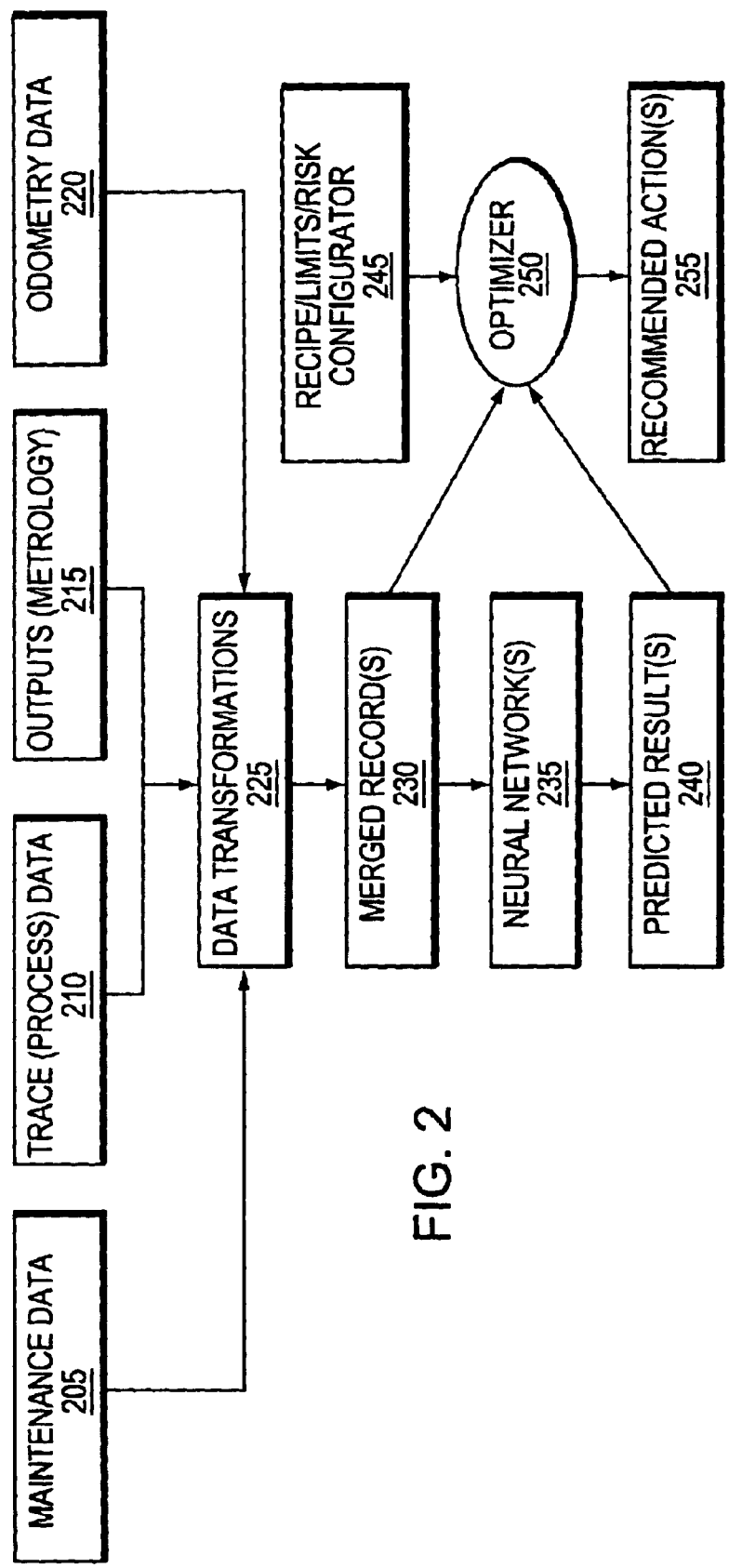
FIG. 2 is a more detailed flow diagram illustrating various embodiments of optimization of process maintenance according to the present invention.

FIG. 2 illustrates in greater detail an embodiment of the method of the invention. Various process metrics such as maintenance data 205, trace process data 210, output data 215, and odometry data 220 are collected over time. Maintenance data 205 may include, for example, the elapsed time since the last maintenance activity. The data is then transformed (according to one or more transformations 225) into a common, merged record format 230 by averaging, filtering, or grouping individual statistics. Using the merged records 230, a neural network 235 may then be trained on the relationship between the maintenance and process data 205, 210, and 220 and process output metrics, thereby producing, for a set of input data, a set of predicted results 240.

In some embodiments, urgencies associated with multiple variables may be considered concurrently. If a maintenance action becomes urgent, the urgencies of related manipulated variables may, in some cases, rise simultaneously. This pattern may occur across multiple recipes and may be visible for maintenance actions addressing process characteristics as diverse as leaks, failing sensors, time between cleans, and slow wear-out of parts. In some embodiments, the neural network may require the registration of at least one maintenance action of a particular kind in its past maintenance database in order to correctly identify the pattern as being associated with this kind of action.

In such embodiments, the invention calculates urgency metrics for multiple corrective actions to determine potential problems as follows: for the $i^{th}$ wafer, the urgency $C_i$ for variable 1 is calculated as:

$$C_i = \text{Max}[(y_i-\mu)/\sigma+k+C_{i-1},0] \qquad \text{Eq. (5)}$$

where $\mu$ is the mean of y (cost associated with the variable) and $\sigma$ is the standard deviation of y. A threshold h is selected based on process requirements. The condition $C_i > h$ indicates that variable 1 (i.e., a part or process related to the variable) needs attention. This process is then repeated for all other variables to generate the multiple variables urgency metrics.

In some exemplary embodiments, urgency metrics of multiple variables may indicate potential problems with the process. Such problems may indicate the need for one or more process maintenance actions. For example, the urgency metrics associated with manipulated variables may indicate a process parameter set-point change for a specific recipe but not for other recipes in the model, e.g., an increase of a gas flow requested only for recipe 1, but not for any other recipes present in the model. Such a result may indicate that the recipe 1 gas flow set-point may not be optimized. Another result may indicate, based on maintenance-variable urgency metrics, the need for a specific part replacement. Other results may indicate a specific part replacement based on both maintenance and manipulated variables (e.g., a request to increase a specific gas flow for all recipes and the replacement of the mass flow controller (MFC) may, for example, indicate a failing MFC rather than a process set-point problem). In some embodiments, because no urgency metric for the faulty part can be computed until at least one replacement event has been logged, a part fault detection for a part never previously replaced may be indicated by the urgencies associated with manipulated variables (e.g., increase of a gas flow requested for all recipes).

For a recipe parameter set-point that is not optimized for a given recipe, the present approach detects the occurrence of chronic, high-urgency metric values for the recipe parameters that need set-point adjustment in a sub-optimally performing recipe. This is tracked by plotting the urgency metrics of manipulated variables over time by recipe, so judgments are based not only on the current sample, but also on the past history of the process. A stable recipe will show a consistently low urgency metric over time.

In the case of a maintenance action that slowly decays in its fitness for use over time, the urgency metric of the associated maintenance variable tends to show an initial intermittent and low value that becomes large and more frequent in its values over time. If the urgency metric persistently exceeds a threshold, is diverging away from a target, or oscillating outside a target range of threshold values, it is likely that the maintenance action should be performed to maintain process health.

When a maintenance action is required in response to a gradual pattern of wear-out and is one to which the neural network has not previously been exposed, signs of its declining fitness for use may be visible in sensed process parameter flows or by in-situ sensors. An optimizer 250 identifies these parameters 245 (manipulated variables) as needing adjustment in an intermittent pattern of low urgency at first, followed by an increased frequency and larger urgency values as time proceeds. The growth in frequency and magnitude of the urgency metric may be seen across all recipes, indicating an intrinsic time-based problem rather than a process-parameter set-point problem. While the appropriate maintenance action is not explicitly identified because the neural network has never trained on this type of action, the network nonetheless narrows the scope of the parts, sensors, or calibration actions that represent potential solutions 255.

In some embodiments, only one of either performing maintenance changes or process parameter changes is considered, rather than performing both simultaneously. However, in such cases the optimization is desirably performed with full knowledge of the effect that the change has on the entire system (including current part lives and delivered recipe parameters) for accurate prediction and simulation capability.

Thus, urgency metrics in accordance herewith may be utilized as indicators of the need for maintenance actions (e.g., to rank the current importance of various actions), as well as for recipe optimization. The urgency concept reflects the quality of the process as it evolves over time, and achieves maximum risk reduction through consideration of the process as a time-based system.

In all of the embodiments of the present invention, the map between the risk reductions and the process metrics can be provided, for example, through the training of a nonlinear regression model against observed discrete maintenance events which are transformed into time-varying measurements by assigning each measurement a "time-since action" value based on the elapsed time since the last maintenance action. The transformed time-varying measurement values from each process run serve as the input to a nonlinear regression model, such as a neural network. The output of the nonlinear regression model is one or more predicted process metrics. The nonlinear regression model is preferably trained by comparing one or more process metrics calculated by the model, based on transformed maintenance values for an actual process run with the actual process metric(s) as measured for that process run. The difference between the computed (i.e., predicted) process metric(s) and the measured process metric(s), or the error, is used to correct adjustable parameters in the regression model. In a preferred embodiment, the regression model is a neural network in which the adjustable parameters are the connection weights between the layers of the neurons in the network.

For example, one version of the regression map may include an input vector for each wafer comprising values for 15 process recipe variables (gasses, pressures, etc.) and values for 60 different "time-since" maintenance variable actions, (time since last MFC C1 replacement, time since last wet clean, time since last MFC $O_2$ replacement, etc.) and therefore each wafer may have an input vector of 75 values. The resulting output vector may then contain any number of process quality, wafer quality, or equipment health variables which are dependent on or functions of the controllable process recipe variables.

In one embodiment, the neural network model architecture comprises a multi-layer feed-forward model with cascade architecture beginning with no hidden units and an adaptive gradient algorithm for back-propagation of prediction errors to adjust network weights. During training, new hidden units are trained to maximize the correlation between the hidden unit's outputs and the residual error at the output of the current training process metrics (i.e. training vector). The new hidden units are added one at a time (or in vector candidate groups) and "cascaded" through weights to subsequent units to reduce the residual error not explained by previous hidden nodes.

Preferably, the non-linear regression models utilized in the present invention are neural network models, and in particular Markov models or hybrid neural network Markov models. Suitable Markov neural network models include, but are not limited to, hidden Markov models, discrete hidden Markov models, and continuous hidden Markov models.

Specifically, in one version, the neural network model and training is as follows. The output of the neural network, r, for a given variable k, is given by $$r_k = \sum_j \left[ W_{jk} \cdot \tanh\left( \sum_i W_{ij} \cdot x_i \right) \right]. \quad \text{Eq. (6)}$$

This equation states that the $i^{th}$ element of the input vector x is multiplied by the connection weights $W_{ij}$. This product is then the argument for a hyperbolic tangent function, which results in another vector. This resulting vector is multiplied by another set of connection weights $W_{jk}$. The subscript i spans the input space (e.g., the input variables). The subscript j spans the space of hidden nodes, and the subscript k spans the output space (e.g., the output variables). The connection weights are elements of matrices, and may be found, for example, by gradient search of the error space with respect to the matrix elements.

The response error function for the minimization of the output response error is given by $$C = \left[ \sum_j (t - r)^2 \right]^{\frac{1}{2}} + \gamma \|W\|^2. \quad \text{Eq. (7)}$$

The first term represents the root-square-error ("RSE") between the target t and the response r. The second term is a constraint that minimizes the magnitude of the connection weight W. If γ (called the regularization coefficient) is large, it will force the weights to take on small magnitude values. With this weight constraint, the response error function will try to minimize the error and force this error to the best optimal between all the training examples without adding excessive weights into the model. The coefficient γ thus acts as an adjustable parameter for the desired degree of the nonlinearity in the model.

In all of the embodiments of the present invention, the cost function can be representative, for example, of the actual monetary cost, or the time and labor, associated with achieving a sub-process metric. The cost function may also be representative of an intangible such as, for example, customer satisfaction, market perceptions, or business risk. Accordingly, it should be understood that it is not central to the present invention what, in actuality, the cost function represents; rather, the numerical values associated with the cost function may represent anything meaningful in terms of the application. Thus, it should be understood that the "cost" associated with the cost function is not limited to monetary costs.

The condition of lowest cost, as defined by the cost function, is the optimal condition, while the requirement of a metric or operational variable to follow defined cost functions and to be within accepted value ranges represents the constraint set. Cost functions are preferably defined for all input and output variables over the operating limits of the variables. The cost function applied to the vector z of n input and output variables at the nominal (current) values is represented as f(z) for z∈ $\Re^n$.

For input and output variables with continuous values, a normalized cost value is assigned to each limit and an increasing piecewise linear cost function assumed for continuous variable operating values between limits. For variables with discrete or binary values, the cost functions are expressed as step functions.

In one embodiment, the optimization model (or method) comprises a genetic algorithm. In another embodiment, the optimization is as for Optimizer I described below. In another embodiment, the optimization is as for Optimizer II described below. In another embodiment, the optimization strategies of Optimization I are utilized with the vector selection and pre-processing strategies of Optimization II.

Optimizer I

In one embodiment, the optimization model is stated as follows:

Min $f(z)$ $Z \in R^n$ s.t. $h(z)=a$ $z^L < z < z^U$ where $f: R^n \to R$ and $h: R^n \to R^n$.

Vector z represents a vector of all input and output variable values, $f(z)$, the objective function, and $h(z)$, the associated constraint vector for elements of z. The variable vector z is composed of sub-process metric inputs, and process metric outputs. The vectors $z^L$ and $z^U$ represent the lower and upper operating ranges for the variables of z.

In one implementation, the optimization method focuses on minimizing the cost of operation over the ranges of all input and output variables. The procedure seeks to minimize the maximum of the operating costs across all input and output variables, while maintaining all within acceptable operating ranges. The introduction of variables with discrete or binary values requires modification to handle the yes/no possibilities for each of these variables.

The following basic notation is useful in describing this optimization model.

$m_1$=the number of continuous input variables.

$m_2$=the number of binary and discrete input variables.

p=the number of output variables.

$m=m_1+m_2$, the total number of input variables.

$z^{m_1} \in R^{m_1}$=vector of $m_1$ continuous input variables.

$z^{m_2} \in R^{m_2}$=the vector of $m_2$ binary and discrete input variables.

$Z^P \in R^P$=the vector of p continuous output variables.

Also let $z \in R^n = [z^{m_1}, z^{m_2}, z^P]$, the vector of all input variables and output variables for a given process run.

As mentioned above, two different forms of the cost function exist: one for continuous variables and another for the discrete and binary variables. In one embodiment, the binary/discrete variable cost function is altered slightly from a step function to a close approximation by a continuous cost function.

The optimization model estimates the relationship between the set of continuous input values and the binary/discrete variables $[z^{m_1}, z^{m_2}]$ to the output continuous values $[z^P]$. In one embodiment, adjustment is made for model imprecision by introducing a constant error-correction factor applied to any estimate produced by the model specific to the current input vector. The error-corrected model becomes, $$g'(z^{m_1}, z^{m_2}) = g(z^{m_1}, z^{m_2}) + e_0$$

where $$e_0 = m_0 - g(z_0^{m_1}, z_0^{m_2});$$

$g(z^{m_1}, z^{m_2})$=the prediction model output based on all input variables;

$g: R^{m_1+m_2} \to R^P$=the mapping representing the relationship between the input and output variables;

$g(z_0^{m_1}, z_0^{m_2})$=the prediction model output vector based on current input variables;

$m_0 \in R^P$=the observed output vector for the current (nominal) state of inputs;

$c(z)$=the cost function vector of all input and output variables of a given process run record; and $c(z(i))$=the $i^{th}$ element of the cost function vector, for i=1, . . . , m+p.

For the continuous input and output variables, cost value is determined by the piecewise continuous function. For the p continuous output variables $[c(z(m+1)), c(z(m+2)), \ldots, c(z(m+p))]$=the cost of the p predicted outputs $g(z^{m_1}, z^{m_2})$.

For $c(z)$, the cost function vector for all the input and output variables of a given process run record, the scalar max $c(z)$=max$\{c(z(i)): i=1, 2, \ldots, m+p\}$, is defined as the maximum cost value of the set of continuous input variables, binary/discrete input variables, and output variables.

The optimization problem, in this example, is to find a set of continuous input and binary/discrete input variables which minimize max($c(z)$). The binary/discrete variables represent discrete metrics (e.g., quality states such as poor/good), whereas the adjustment of the continuous variables produces a continuous metric space. In addition, the interaction between the costs for binary/discrete variables, $c(z^{m_2})$, and the costs for the continuous output variables, $c(z^P)$, are correlated and highly nonlinear. In one embodiment, these problems are addressed by performing the optimization in two parts: a discrete component and continuous component. The set of all possible sequences of binary/discrete metric values is enumerated, including the null set. For computational efficiency, a subset of this set may be extracted. For each possible combination of binary/discrete values, a continuous optimization is performed using a general-purpose nonlinear optimizer, such as dynamic hill climbing or feasible sequential quadratic programming, to find the value of the input variable vector, $z_{opt}^m$, that minimizes the summed total cost of all input and output variables $$f(z) = \sum_{i=1} c(z(i)) \qquad \text{Eq. (8)}$$

or the maximum cost of all input and output variables $$f(z) = \max c(z(i)) \qquad \text{Eq. (9).}$$

Optimizer II

In another embodiment a heuristic optimization method designed to complement the embodiments described under Optimizer I is employed. The principal difference between the two techniques is in the weighting of the input-output variable listing. Optimizer II favors adjusting the variables that have the greatest individual impacts on the achievement of target output vector values, e.g., the target process metrics. Generally, Optimizer II achieves the specification ranges with a minimal number of input variables adjusted from the nominal. This is referred to as the "least labor alternative." It is envisioned that when the optimization output of Optimizer II calls for adjustment of a subset of the variables adjusted using the embodiments of Optimizer I, these variables represent the principal subset involved with the achievement of the target process metric. The additional variable adjustments in the Optimization I algorithm may be minimizing overall cost through movement of the input variable into a lower cost region of operation.

In one embodiment, Optimization II proceeds as follows:

Min $f(z)$ $z \in \Phi$ s.t. $h(z) = a$ $z^L \leq z \leq z^U$ where $\Phi = \{z^j \in R^n: j \leq s \in I;$ an s vector set$\}$.

$f: R^n \rightarrow R$ and $h: R^n \rightarrow R^n$.

The index j refers to the $j^{th}$ vector of a total of s vectors of dimension $n = m+p$, the total number of input (m) plus output variables (p), respectively, which are included in the set to be optimized by f. The determination of s discrete vectors from an original vector set containing both continuous and binary/discrete variables may be arrived at by initial creation of a discrete rate change from nominal partitioning. For each continuous variable, several different rate changes from the nominal value are formed. For the binary variables only two partitions are possible. For example, a continuous variable rate-change partition of −0.8 specifies reduction of the input variable by 80% from the current nominal value. The number of valid rate partitions for the m continuous variables is denoted as $n_m$.

A vector z is included in $\Phi$ according to the following criterion. (The case is presented for continuous input variables, with the understanding that the procedure follows for the binary/discrete variables with the only difference that two partitions are possible for each binary variable, not $n_m$.) Each continuous variable is individually changed from its nominal setting across all rate partition values while the remaining m−1 input variables are held at nominal value. The p output variables are computed from the inputs, forming z.

Inclusion of z within the set of vectors to be cost-optimized is determined by the degree to which the output variables approach targeted values. The notation $z_{ik}(l) \in R$, $l = 1, 2, \ldots p$, refers to the $l^{th}$ output value obtained when the input variable vector is evaluated at nominal variable values with the exception of the $i^{th}$ input variable which is evaluated at its $k^{th}$ rate partition. In addition, $z_{ik} \in R$ is the value of the $i^{th}$ input variable at its $k^{th}$ rate partition from nominal. The target value for the $l^{th}$ output variable $l = 1, 2, \ldots p$ is target (l) and the $l^{th}$ output variable value for the nominal input vector values is denoted $z_0(l)$.

The condition for accepting the specific variable at a specified rate change from nominal for inclusion in the optimization stage is as follows.

For each $i \leq m$, and each $k \leq n_m$ if $|(z_{ik}(l) - \text{target}(l))/(z_0(l) - \text{target}(l))| < K(l)$ for $1 \leq p$, $0 \leq K(l) \leq 1$, and $z^L \leq z_i^j \leq z^U$ then $z_{ik} \in \Delta_i$ = acceptable rate partitioned values of the $i^{th}$ input variable.

To each set $\Delta_i$, $i = 1, \ldots, m$ is added the $i^{th}$ nominal value. The final set $\Phi$ of n-dimension vectors is composed of the crossing of all the elements of the sets $\Delta_i$ of acceptable input variable rate-partitioned values from nominal. Thus, the total number of vectors $z \in \Phi$ equals the product of the dimensions of the $\Delta_i$:

$$\text{Total vectors} \in \Phi = \left(\prod_i^{m_1} n_i\right) * (2^{m_2}) \quad \text{Eq. (10)}$$

for $m_1$ = the number of continuous input variables $m_2$ = the number of binary and discrete variables where there are $m_2$ binary variables. In some embodiments, the $m_2$ variable may consist of a subset of binary variables ($m_{2a}$) and the remaining variables ($m_{2b}$) consisting of discrete variables with one of some number of distinct values, g. In this case, Eq. 10 becomes:

$$= \left(\prod_i^{m_1} n_i\right) * (2^{m_{2a}} * g^{m_{2b}}) \quad \text{Eq. (11)}$$

The vector set $\Phi$ resembles a fully crossed main effects model which most aggressively approaches one or more of the targeted output values without violating the operating limits of the remaining output values.

This weighting strategy for choice of input vector construction generally favors minimal variable adjustments to reach output targets. In one embodiment, the Optimization II strategy seeks to minimize the weighted objective function $$f(z^j) = \sum_{i=1}^m c(z_i^j) + pV\left(\prod_{i=m+1}^{m+p} c(z_i^j)\right)^{1/p} \quad \text{Eq. (12)}$$

for pV. The last p terms of z are the output variable values computed from the n inputs. The term $$\left(\prod_{i=m+1}^{m+p} c(z_i^j)\right)^{1/p}$$

is intended to help remove sensitivity to large-valued outliers. In this way, the approach favors the cost structure for which the majority of the output variables lie close to target, as compared to all variables being the same mean cost differential from target.

Values of pV >> 3 represent weighting the adherence of the output variables to target values as more important than adjustments of input variables to lower cost structures that result in no improvement in quality.

In another embodiment, the Optimization II method seeks to minimize the weighted objective function $$f(z^j) = \sum_{i=1}^m c(z_i^j) + V\left(\prod_{i=m+1}^{m+p} c(z_i^j)\right) \quad \text{Eq. (13)}$$

for V. The last p terms of z are the output variable values computed from the n inputs.

Figure 3:
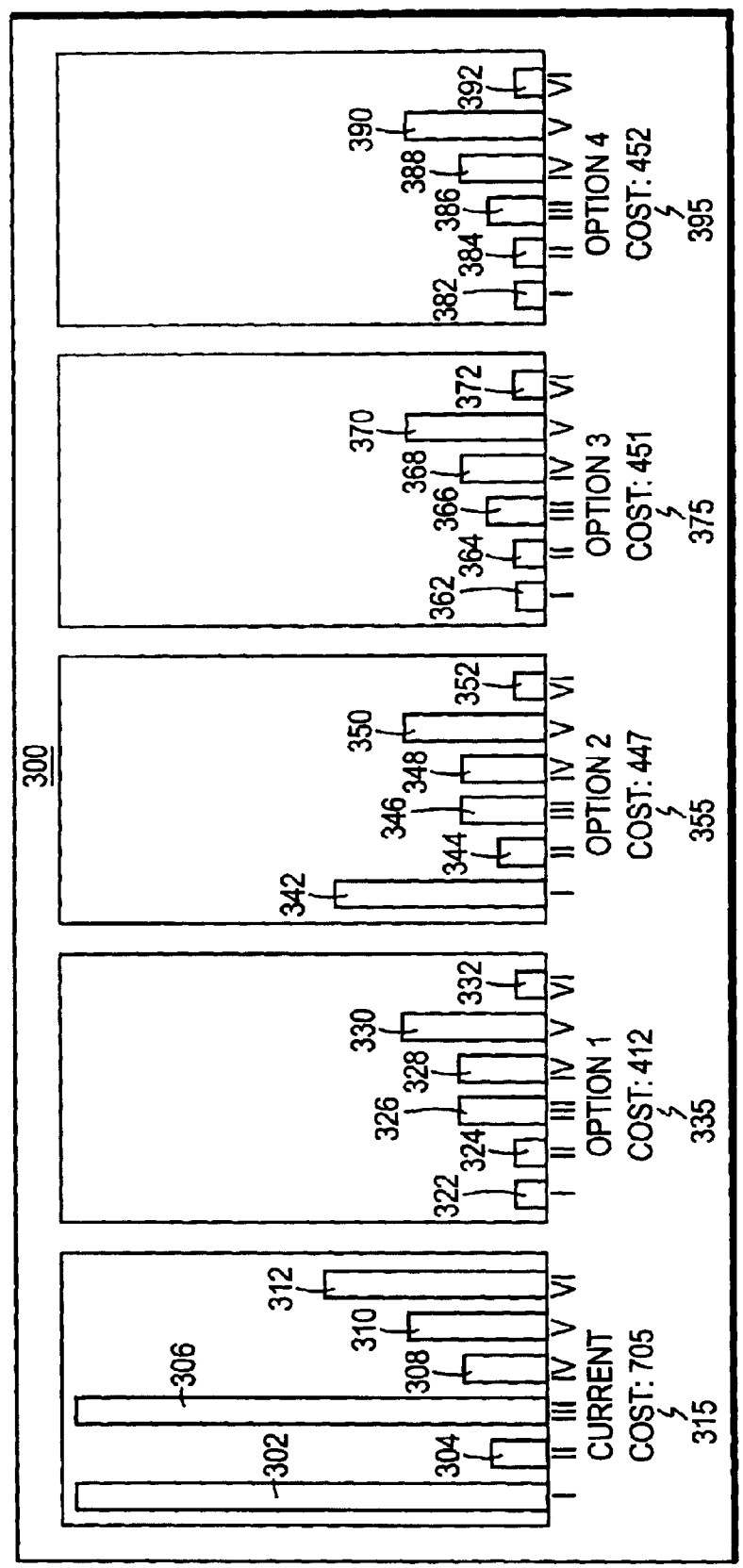
FIG. 3 illustrates various examples of maintenance activity prediction for a process according to the present invention.

FIG. 3 represents, for one embodiment of the invention, an example of calculated risk reductions and the associated costs associated with each corrective action given an initial set of process metrics. A chart 300 of initial process metrics displays the risk values associated with individual process parameters 302, 304, 306, 308, 310, and 312 in the current process condition as well as the overall cost value for the current condition 315. Examples of such process parameters (I, II, III, IV, V, and VI in FIG. 3) include wafer pressure, gas pressure, gas flow rate, etch rate, and particle count. Furthermore, the system presents four proposed maintenance action options, shown as Options 1 through 4. In some embodiments, more than four proposed maintenance actions are presented, while in others fewer than four may be presented.

For each proposed maintenance action option, the predicted individual risk values for each process parameter are calculated, as well as a predicted overall cost value for performing the action. For example, Option 1 represents the predicted risk values 322, 324, 326, 328, 330, and 332 of each of the six process parameters I–VI, and a predicted total cost value 335. Option 2 represents risk values of each of the same six process parameters, but with different predicted risk values 342, 344, 346, 348, 350, and 352 based on performing different maintenance activities, and a predicted total cost value 355. The same representative information is displayed for Option 3 (362, 364, 366, 368, 370, and 372) and Option 4 (382, 384, 386, 388, 390 and 392). The predicted cost values (335, 355, 375, and 395) for each of the four options are compared, and the option providing the lowest predicted cost is selected such that the proposed maintenance actions are then performed. In the example of FIG. 3, Option 1 provides a predicted cost of 412, which is lower than the predicted costs for Option 2 (447), Option 3 (451), and Option 4 (452) and therefore the maintenance actions represented by Option 1 are performed.

Figure 4:
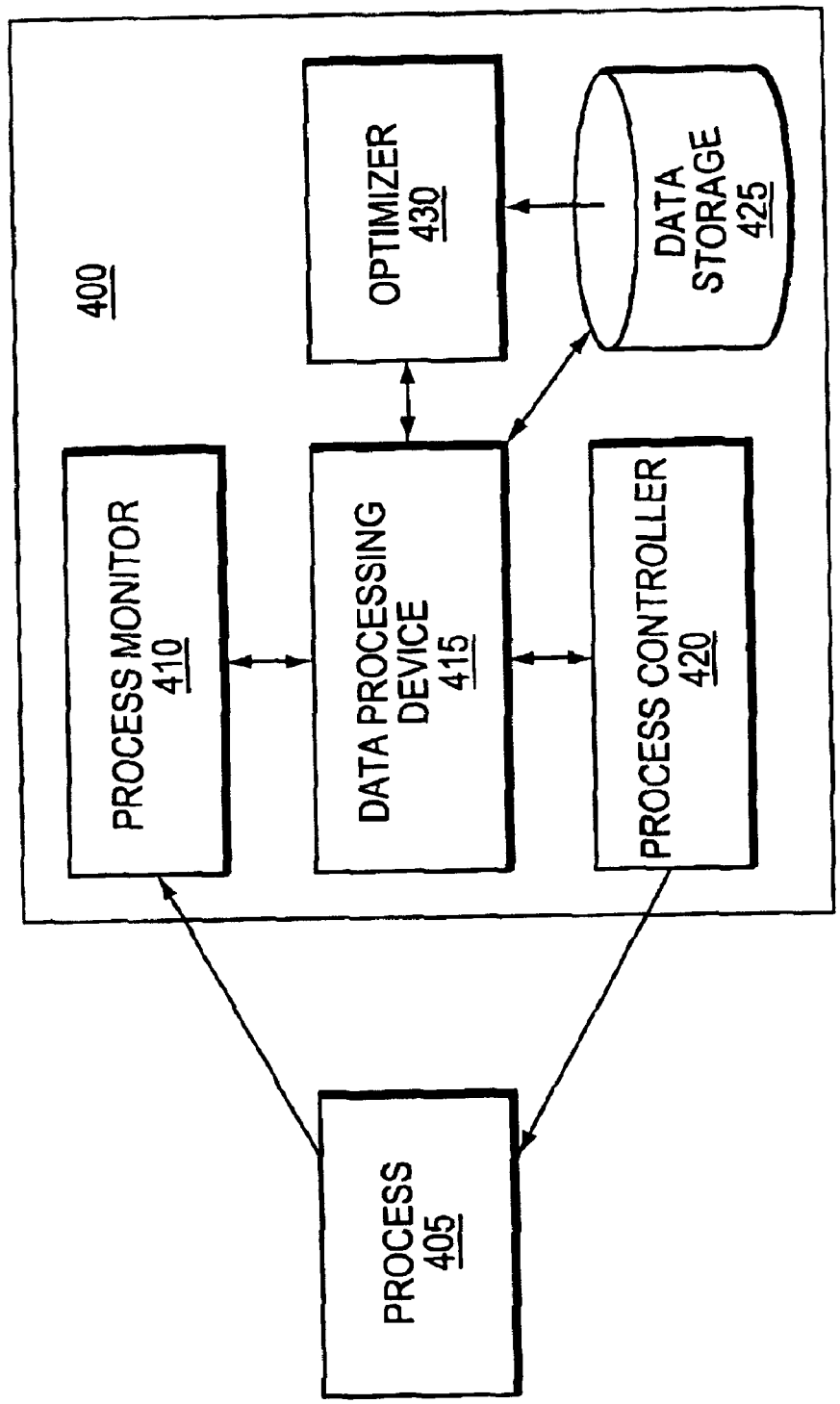
FIG. 4 is a schematic illustration of various embodiments of a system adapted to practice the methods of the present invention.

FIG. 4 schematically represents a hardware embodiment of the invention realized as a system 400 for optimizing the maintenance activities for a process 405. The system 400 comprises a process monitor 410, a data processing device 415, a process controller 420, a data storage device 425, and an optimizer 430.

The process monitor 410 receives process metrics representing the health of the process 405. The process metrics may reflect one or more aspects of the operation of the process 405, such as tool pressure, etch rate, or power supply, and/or the environment in which the process is operating, such as temperature, or other operational measurements. The process monitor 410 generally includes conventional ports and may also include circuitry for receiving time-varying analog data signals, and analog-to-digital conversion circuitry for digitizing the signals.

The process monitor 410 causes process output metrics to be transmitted to the data processing device 415. The data processing device 415, using methods described above, calculates risk reduction statistics and urgency metrics for one or more corrective actions based on a relationship between the risk reductions and the process output metrics. The data processing device 415 may receive signals in analog or digital form. In other embodiments, the data processing device 415 may implement the functionality of the present invention as software on a general purpose computer. In addition, such a program may set aside portions of a computer's random access memory to provide control logic that affects one or more of the measuring of metrics, the measuring of operational variables, the provision of target metric values, the provision of constraint sets, the prediction of metrics, the determination of metrics, the implementation of an optimizer, determination of operational variables, and detecting deviations of or in a metric. In such an embodiment, the program may be written in any one of a number of high-level languages, such as FORTRAN, PASCAL, C, C++, Tcl, or BASIC. Further, the program can be written in a script, macro, or functionality embedded in commercially available software, such as EXCEL or VISUAL BASIC. Additionally, the software could be implemented in an assembly language directed to a microprocessor resident on a computer. For example, the software can be implemented in Intel 80×86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

The optimizer 430, using at least one set of target output metrics and cost records stored in the data storage device 425, determines, based on the cost reduction for the potential corrective actions and the target process metrics (input), the optimal corrective action(s) (output) for the process 405 that produces output metrics that are substantially close to a target process metric(s) and minimize the overall cost. The optimizer 430 then causes the measurement values to be transmitted to the data processing device 415.

The data processing device 415, having received the corrective actions from the optimizer 430 maps the relationship between the risk reductions associated with the corrective actions and the process output metrics. The data processing device 415 then instructs the process controller 420 to initiate one or more corrective actions for the process 405 in such a manner as to reduce the overall risk that the process will produce process outputs that are outside of a set of acceptable limits. The process controller 420 may be, for example, a conventional programmable logic controller (PLC) or a group of PLCs that control one or more manipulable variables of the process, e.g., by governing valves, ports, machine controls, thermostats, etc. In some embodiments, the optimizer 430 communicates directly with the process controller 420, sending instructions for initiating corrective actions for the process 405.

While the invention has been particularly shown and described with reference to specific embodiments, it should be understood by those skilled in the area that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A computer-implemented method of controlling the optimization of a complex process having associated operational variables and process outputs, the method comprising the steps of:

defining a series of corrective actions associated with the process;

modeling a relationship between the operational variables and the process outputs measured over time;

for each corrective action, computing a risk reduction associated with the process outputs; and determining an urgency metric, based at least in part on the risk reductions, for each of the corrective actions.

2. The method of claim 1 wherein the corrective actions comprise maintenance operations.

3. The method of claim 1 wherein the corrective actions comprise part replacements.

4. The method of claim 1 wherein the corrective actions comprise recipe adjustments.

5. The method of claim 1 wherein the relationship between the operational variables and the process outputs is modeled using a nonlinear regression model.

6. The method of claim 5 wherein the nonlinear regression model comprises a neural network.

7. The method of claim 1 wherein the urgency metrics are determined based on a cumulative sum of one or more risk reductions.

8. The method of claim 1 further comprising performing a corrective action based at least in part on the urgency levels.

9. The method of claim 8 further comprising performing a corrective action based at least in part on the cost of performing the corrective action.

10. An article of manufacture having a computer-readable medium with computer-readable instructions embodied thereon for performing the method of claim 1.

11. A system for controlling the optimization of a complex process having associated operational variables and process outputs, the system comprising:
   (a) a process monitor for monitoring process outputs over time; and
   (b) a data processing device for receiving, from the process monitor, data indicative of values of the process outputs, and determining the urgency levels for one or more corrective actions based on (i) a risk reduction associated with the process outputs, and (ii) a relationship between the operational variables and the process outputs.

12. The system of claim 11 further comprising an optimizer for determining one or more corrective actions, based at least in part on the risk reductions.

13. The system of claim 12 wherein the optimizer is part of the data processing device.

14. The system of claim 11 further comprising a process controller, responsive to the optimizer, for initiating one or more corrective actions.

15. The system of claim 11 further comprising a database module for storing at least one of target process metrics; corrective action costs; process state information; and possible corrective actions.

16. The system of claim 11 wherein the corrective actions comprise maintenance operations.

17. The system of claim 11 wherein the corrective actions comprise part replacements.

18. The system of claim 11 wherein the corrective actions comprise recipe adjustments.

* * * * *